(12) United States Patent
Demerly et al.

(10) Patent No.: US 11,203,377 B2
(45) Date of Patent: Dec. 21, 2021

(54) SYSTEM AND METHOD TO ESTIMATE A TIE-ROD FORCE AND CONTROL THE STEERING OF A VEHICLE

(71) Applicant: Veoneer US, Inc., Southfield, MI (US)

(72) Inventors: Jon D. Demerly, Byron, MI (US); Hsin-Hsiang Yang, Ann Arbor, MI (US)

(73) Assignee: VEONEER US, INC., Southfield, MI (US)

( * ) Notice: Subject to any disclaimer, the term of this patent is extended or adjusted under 35 U.S.C. 154(b) by 97 days.

(21) Appl. No.: 16/362,151

(22) Filed: Mar. 22, 2019

(65) Prior Publication Data
US 2020/0298905 A1 Sep. 24, 2020

(51) Int. Cl.
*B62D 5/04* (2006.01)
*B60W 10/20* (2006.01)
*B60W 50/00* (2006.01)
*B60W 10/22* (2006.01)

(52) U.S. Cl.
CPC .......... *B62D 5/0463* (2013.01); *B60W 10/20* (2013.01); *B60W 10/22* (2013.01); *B60W 2050/0026* (2013.01)

(58) Field of Classification Search
CPC ....... B60W 2050/0026; B60W 40/109; B60W 30/045; B60W 10/20; B60W 10/22; B62D 5/0463; B62D 5/0457
See application file for complete search history.

(56) References Cited

U.S. PATENT DOCUMENTS

| 5,198,981 A * | 3/1993 | Collier-Hallman ........................ B62D 5/0463 180/446 |
| 6,079,513 A * | 6/2000 | Nishizaki ............... B62D 5/006 180/402 |
| 2009/0292421 A1* | 11/2009 | Williams ............. B62D 5/0484 701/42 |
| 2015/0158524 A1* | 6/2015 | Lee .......................... B62D 1/28 701/41 |
| 2017/0131164 A1* | 5/2017 | Bourdrez ............... B62D 6/008 |
| 2019/0031231 A1* | 1/2019 | George ................ B62D 5/0463 |

(Continued)

FOREIGN PATENT DOCUMENTS

EP 1610999 * 4/2009 ............. B62D 6/005

OTHER PUBLICATIONS

"Written Opinion of International Searching Authority" for USPCT2020023965, dated Jun. 2020, International Searching Authority, Whole Document (Year: 2020).*

*Primary Examiner* — Peter D Nolan
*Assistant Examiner* — Kenneth M Dunne
(74) *Attorney, Agent, or Firm* — Dickinson Wright PLLC

(57) ABSTRACT

A system and method for controlling the steering of a vehicle includes a processor, a velocity sensor in communication with the processor a steering angle sensor in communication with the processor, accelerometer in communication with the processor and a steering angle controller in communication with the processor. The processor is configured to receive the acceleration of the vehicle from the accelerometer and the velocity from the velocity sensor, determine the estimated tie-rod force utilizing the lookup table tie-rod force estimation lookup table, and instruct the steering wheel angle controller to apply an additional force substantially equal to the estimated tie-rod force to the steering torque.

9 Claims, 4 Drawing Sheets

(56) References Cited

U.S. PATENT DOCUMENTS

2019/0061809 A1* 2/2019 Weiefors .............. B62D 15/025
2019/0276008 A1* 9/2019 Yang ............... B60W 30/18145
2019/0351942 A1* 11/2019 de Paula Eduardo ......................
                                                           B62D 15/025
2019/0359252 A1* 11/2019 Yu ......................... G06F 17/142
2020/0262474 A1* 8/2020 Varunjikar .......... B60W 40/068

* cited by examiner

SYSTEM AND METHOD TO ESTIMATE A TIE-ROD FORCE AND CONTROL THE STEERING OF A VEHICLE

BACKGROUND

1. Field of the Invention

The present invention generally relates to systems and methods for controlling the steering of a vehicle.

2. Description of Related Art

With regards to autonomous vehicles, autonomous vehicles have the ability to control both the steering and velocity of the vehicle. One significant challenge deals with controlling the steering so as to compensate the forces that present themselves as the vehicle is being operated. One of these forces is the tie rod force feedback from the suspension.

The tie rod is a part of the steering mechanism in a vehicle. A tie rod consists of an inner and outer end. The tie rod transmits force from the steering center link or rack gear to the steering knuckle. This will cause the wheel to turn. The outer tie rod end connects with an adjusting sleeve, which allows the length of the tie rod to be adjustable. This adjustment is used to set a vehicle's alignment angle.

A tie rod force feedback must be considered when making any steering decisions for the vehicle. There is significant asymmetrical behavior that makes controlling the steering a challenge. Generally, the typical approach is to have a more complex steering system model for estimating the tie rod force.

However, while this more complex steering system model for estimating the tie rod force is effective, is extremely processor intensive and difficult to implement.

SUMMARY

A system and method for controlling the steering of a vehicle includes a processor, a velocity sensor in communication with the processor a steering angle sensor in communication with the processor, accelerometer in communication with the processor and a steering angle controller in communication with the processor. The processor is configured to receive the acceleration of the vehicle from the accelerometer and the velocity from the velocity sensor, determine the estimated tie-rod force utilizing the lookup table tie-rod force estimation lookup table, and instruct the steering wheel angle controller to apply an additional force substantially equal to the estimated tie-rod force to the steering torque.

Further objects, features, and advantages of this invention will become readily apparent to persons skilled in the art after a review of the following description, with reference to the drawings and claims that are appended to and form a part of this specification.

DETAILED DESCRIPTION

Figure 1:
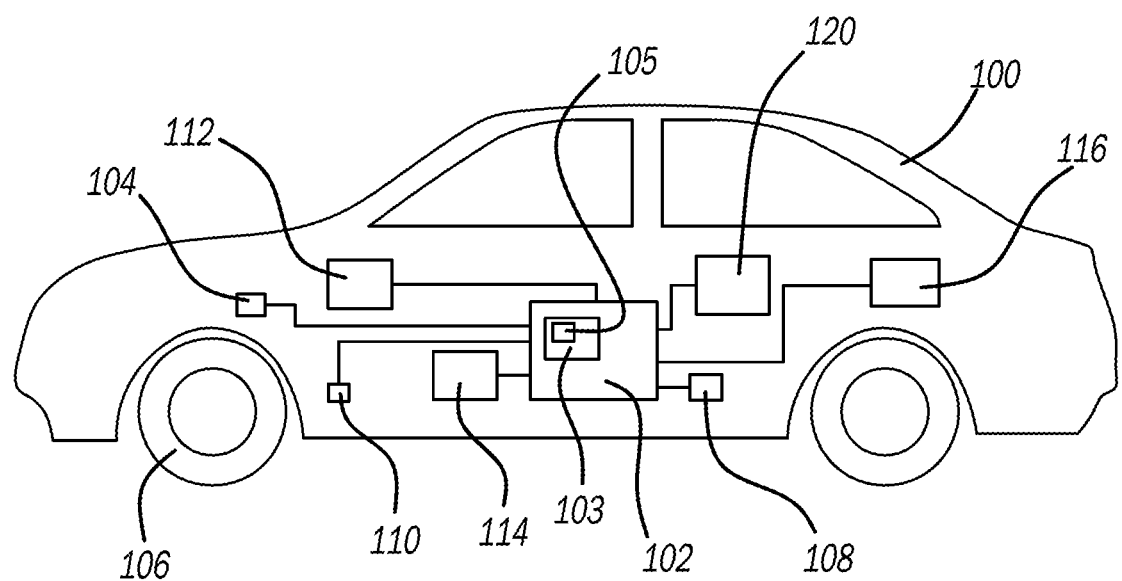
FIG. 1 illustrates a block diagram of a vehicle having a system for controlling the steering of the vehicle.

Referring to FIG. 1, a vehicle 100 is shown. It should be understood that the vehicle 100 could be any type of vehicle capable of transporting persons or items from one point to another. As such, the vehicle may be a car, truck, commercial vehicle, tractor trailer, farm tractor, mining vehicle, and the like. Again, the vehicle 100 may be any type of vehicle so long as it is capable of transporting persons or items from one location to another.

Here, the vehicle 100 includes a processor 102. The processor 102 may be a single processor or may be multiple processors working in concert. Generally, the processor is arranged within the interior of the vehicle 100. The processor 102 may be separately connected to or may incorporate a memory device 103. Here, the memory device 103 is shown to be integrated within the processor 102, but it should be understood that the memory device 103 may be separate from the processor 102. The memory device 103 may be any type of memory device capable of storing digital information. As such, the memory device 103 may be a solid-state memory device, optical memory device, magnetic memory device, and the like. The memory device may include instructions 105 and/or other data, such as lookup tables. In the case of instructions, instructions may include executable code for executing any one of the methods disclosed in this specification.

The processor 102 may be connected to a number of different sensors for sensing different physical parameters of the vehicle. For example, the processor 102 may be in communication with the velocity sensor 104. The velocity sensor 104 may be a wheel speed sensor mounted and arranged within the vehicle 100 so as to be able to determine the wheel speed of at least one wheel 106 of the vehicle. Of course, it should be understood that the vehicle 100 may have multiple wheel speed sensors for each of the wheels.

Additionally, the vehicle 100 may include an accelerometer 108 also in communication with the processor 102. The accelerometer 108 is capable of determining the acceleration of the vehicle 100 and is mounted in the vehicle to accomplish this task. The accelerometer 108 may measure acceleration any one of a number of directions including lateral and/or transverse acceleration. The vehicle 100 may also include a steering wheel angle sensor 110 configures to determine the steering wheel angle of the vehicle 100.

The processor 102 may be connected to a number of different vehicle systems capable of controlling the vehicle 100. For example, the processor 102 may be in communication with a steering control system 112. The steering control system 112 may be connected to a steering system that essentially controls the steering of the vehicle 100 based on instructions from the processor 102.

The processor 102 may also be in communication with a throttle control system 114. The throttle control system 114 is configured to control the throttle position of the engine of the vehicle. As the throttle position of the engine of the vehicle changes, the vehicle can be instructed to change speeds.

The processor 102 may also be in communication with the brake control system 116 as configured to control the brakes of the vehicle. The brakes of the vehicle allow the vehicle to slow down and/or remain in a stopped position. The brake control system 116 receives instructions from the processor 102 and is able to actuate the vehicle brakes so as to slow the vehicle 100 down or keep it in a stopped position. It should be understood that the throttle control system 114 in the brake control system 116 may be incorporated within a single control unit. This may be because the ability to control the brakes and/or throttle the vehicle are both related to controlling the velocity of the vehicle.

The processor 102 may also be in communication with an autonomous vehicle control system 120 that provides instructions to the processor to relay these instructions to any which one of the vehicle control systems, such as the steering control system 112, throttle control system 114 and/or the braking control system 116. For example, the autonomous vehicle control system 120 may provide instructions to the processor 102 to accelerate the vehicle, slow down the vehicle, apply the brakes, and other commands. These commands may be arrange as an array of commands.

Figure 2:
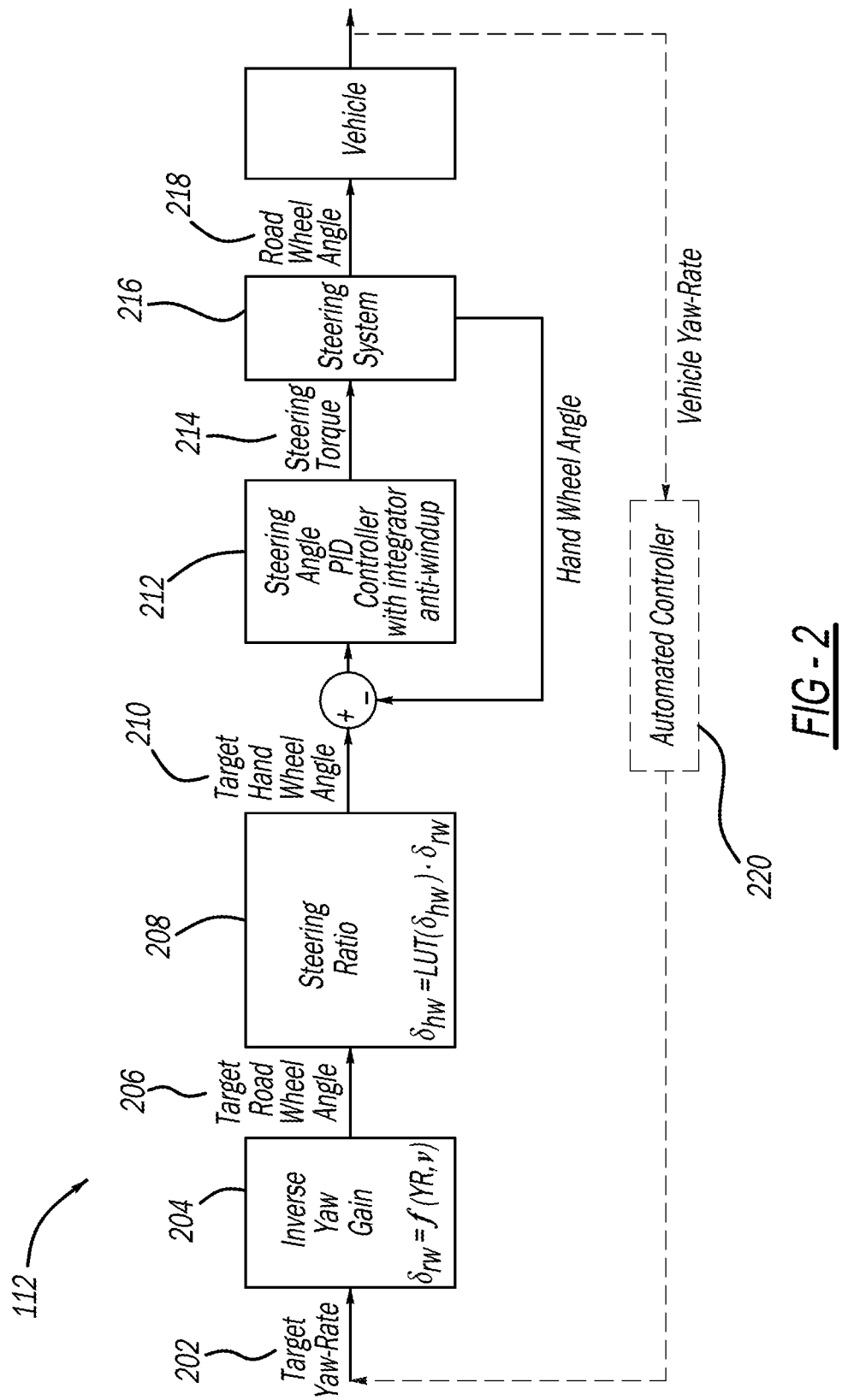
FIG. 2 illustrates a block diagram of a steering control system.

Referring to FIG. 2, a more detailed diagram of the steering control system 112 is shown. Here, the steering control system receives a target yaw rate 202 for the vehicle to be steered towards. An inverse yaw gain module 204 determines a target road wheel angle 206. The steering ratio module 208 takes the target road wheel angle 206 and creates a target hand wheel angle 210. From there, a steering angle controller 212 takes the target hand wheel angle 210 and determines an amount of torque 214 to apply to a steering system 216.

From there, as the steering system 216 steers the vehicle, the hand wheel angle changes and is fed back into the steering angle controller 212. An automated controller 220 may also be utilized to automate the vehicle yaw rate determination.

Figure 3:
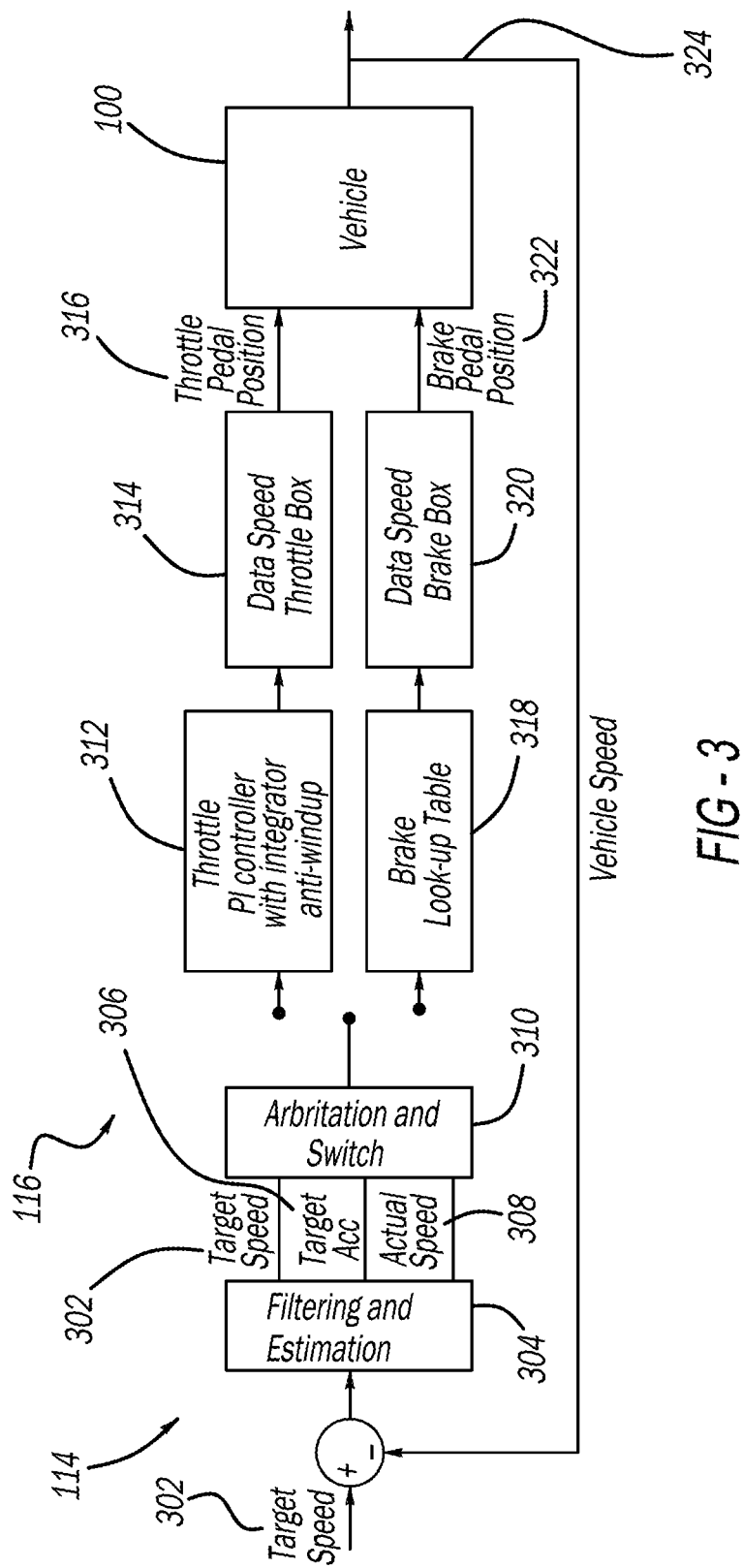
FIG. 3 illustrates a block diagram of a throttle control system and a brake control system.

Referring to FIG. 3, a more detailed view of the throttle control system 114 and brake control system 116 is shown. It could be understood that the throttle control system 114 and the brake control system 116 may be separate components or may be integrated together as shown in FIG. 3.

Here, a filtering and estimation module 304 receives a target speed 302. The filtering estimation module 304 determines a target speed 302 and a target acceleration 306 from the target speed 302. In addition, a filtering estimation module 304 determines the actual speed 308 that may be provided by the velocity sensor 104, which as stated previously, may be a wheel speed sensor.

Also shown is a switch 310. The switch 310 determines if the throttle or brake should be controlled. This switch 310 may have the ability to control both the throttle and the brake at the same time. Here, the throttle controller 312 communicates to the throttle box 314 which then adjusts the throttle pedal position 316 of the vehicle 100. By adjusting the throttle position, the vehicle can be slowed down or sped up.

If the brake system is utilized, a brake look-up table 318 is utilized so as to determine how much force of the brake should be utilized based on the target speed 302, the target acceleration 306 and the actual speed 308. This look-up table provides the appropriate amount of brake pressure to the data speed brake box 320 which in turn adjusts the brake pedal position 322 of the vehicle 100. The brake lookup table may be stored within the memory device 103 of FIG. 1. As such, the brake of the vehicle can be applied and removed and a certain amount of pressure can be applied to the brake pedal. This eventually results in a vehicle speed 324 which is then fed back into the filtering and estimation module 304.

Figure 4:
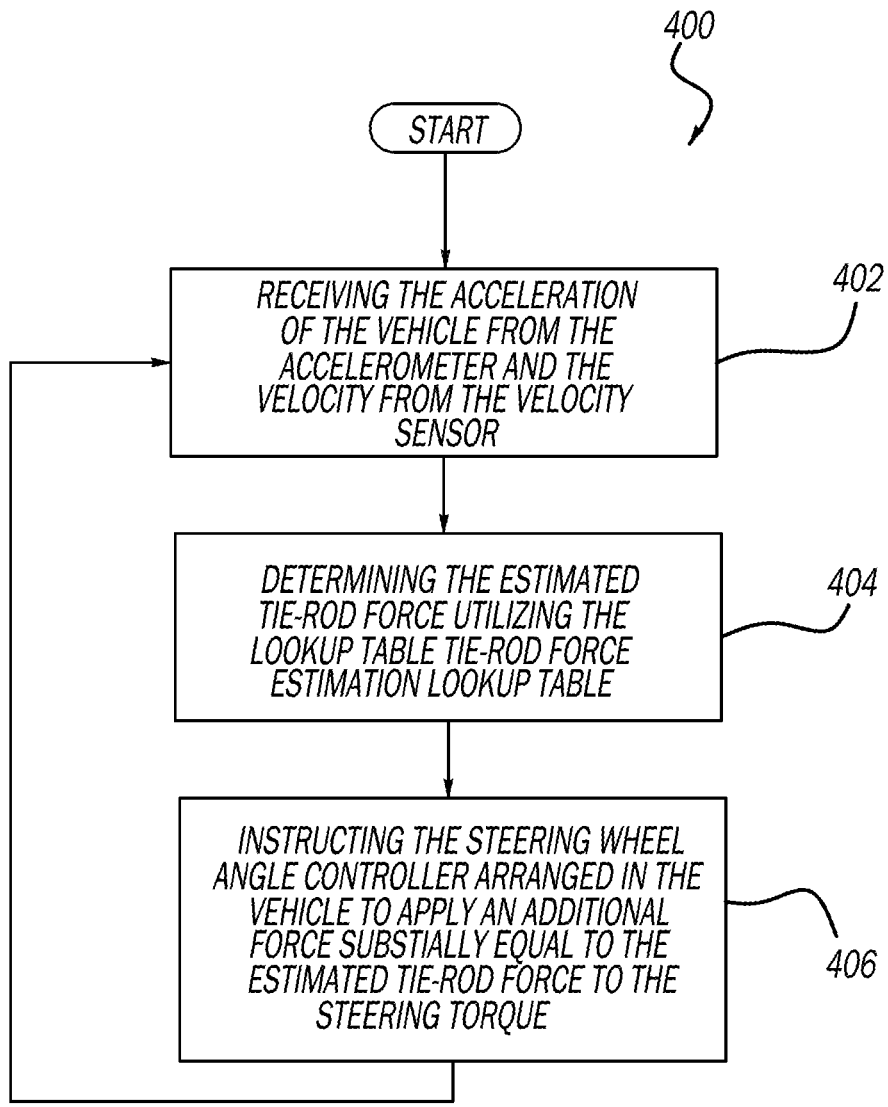
FIG. 4 illustrates a method for controlling estimating tie rod force and controlling the steering of the vehicle.

Referring to FIG. 4, a method for controlling the vehicle 400 is shown. In step 402, the processor 102 is configured to receive the acceleration of the vehicle from the accelerometer 108 in the velocity from the velocity sensor 104. In step 404, the processor 102 is configured to estimate the tie rod force using a look-up table. The lookup table may be stored within the memory device 103 of FIG. 1. The look-up table outputs the amount an additional force that should be applied to the steering. Thereafter, in step 406, the processor 102 is configured to instruct the steering control system 112 to apply an additional force substantially equal to the estimated tie rod force to the steering torque. Thereafter, executing step 406, the method returns again to step 402.

Essentially, a feedforward type of compensator is implemented to cancel the tie-rod force. This force utilized to cancel the tie Rod force could be expressed as:

$$\text{Torque}_{tr} = \text{LUT}(SWA_{actual}, v_{actual})$$

The look-up table (LUT) is generated by experiment. This compensator will reduce the needs of I-control so that improves the transient response.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation, and change, without departing from the spirit of this invention, as defined in the following claims.

The invention claimed is:

1. A system to control the steering of a vehicle, the system comprising:
    a processor;
    a steering angle sensor in communication with the processor and mounted within the vehicle to detect the steering angle;
    a velocity sensor in communication with the processor and mounted within the vehicle to detect the velocity of the vehicle;
    an accelerometer in communication with the processor and mounted within the vehicle to detect an acceleration of the vehicle;
    a steering angle controller in communication with the processor, the steering angle controller configured to apply a steering torque to a steering system so as to steer the vehicle; and
    a memory in communication with the processor, the memory containing a tie-rod force estimation lookup table, wherein the tie-rod force estimation lookup table provides an estimated tie-rod force transmitted between a steering center link or a rack gear and a steering knuckle by using the acceleration of the vehicle and the velocity of the vehicle;

wherein the processor is configured to:

receive the acceleration of the vehicle from the accelerometer and the velocity from the velocity sensor, determine the estimated tie-rod force utilizing the tie-rod force estimation lookup table, and instruct the steering angle controller to apply an additional force to the steering torque, the additional force being substantially equal to the estimated tie-rod force.

2. The system of claim 1, wherein the velocity sensor is a wheel speed sensor.

3. The system of claim 1, wherein the accelerometer is configured to detect a lateral acceleration of the vehicle.

4. A method to control the steering of a vehicle, the method comprising the steps of:

receiving an acceleration of the vehicle from an accelerometer mounted to the vehicle and a velocity of the vehicle from a velocity sensor mounted to the vehicle;

determining the estimated tie-rod force transmitted between a steering center link or a rack gear and a steering knuckle utilizing a tie-rod force estimation lookup table; and instructing a steering angle controller arranged in the vehicle to apply an additional force to the steering torque, the additional force being substantially equal to the estimated tie-rod force.

5. The method of claim 4, further comprising receiving a steering angle from a steering angle sensor mounted within the vehicle to detect the steering angle.

6. The method of claim 4, wherein the steering angle controller configured to apply a steering torque to a steering system so as to steer the vehicle.

7. The method of claim 4, wherein the tie-rod force estimation lookup table comprises an estimated tie-rod force by using the acceleration of the vehicle and the velocity of the vehicle.

8. The method of claim 4, wherein the velocity sensor is a wheel speed sensor.

9. The method of claim 4, wherein the accelerometer is configured to detect a lateral acceleration of the vehicle.

\* \* \* \* \*